US012509195B2

(12) United States Patent
Okuda

(10) Patent No.: US 12,509,195 B2
(45) Date of Patent: Dec. 30, 2025

(54) TIDAL INFORMATION DISPLAY DEVICE

(71) Applicant: Furuno Electric Co., Ltd., Hyogo (JP)

(72) Inventor: Masato Okuda, Kyoto (JP)

(73) Assignee: Furuno Electric Co., Ltd., Hyogo (JP)

( * ) Notice: Subject to any disclaimer, the term of this patent is extended or adjusted under 35 U.S.C. 154(b) by 447 days.

(21) Appl. No.: 17/644,709

(22) Filed: Dec. 16, 2021

(65) Prior Publication Data

US 2022/0355908 A1     Nov. 10, 2022

(30) Foreign Application Priority Data

May 5, 2021    (EP) ..................................... 21172316

(51) Int. Cl.
*G06T 15/00*     (2011.01)
*B63B 49/00*     (2006.01)
(Continued)

(52) U.S. Cl.
CPC .............. *B63B 79/15* (2020.01); *B63B 49/00* (2013.01); *G06F 3/04817* (2013.01);
(Continued)

(58) Field of Classification Search
CPC ..... B63B 49/00; B63B 79/15; B63B 2213/02; G01C 13/004; G01C 21/203;
(Continued)

(56) References Cited

U.S. PATENT DOCUMENTS 5,347,497  A      9/1994   Allen
7,209,829  B2 *   4/2007   Litvack ................ G01C 21/203
                                                       701/410
(Continued)

FOREIGN PATENT DOCUMENTS

EP       4086573 A1    11/2022
GB       2474715 A      4/2011
(Continued)

OTHER PUBLICATIONS

Salama GM, Hamed HF, Deabes EA, Othman SE. An innovative technique for the development of the traditional mechanical tide gauge to improve the performance of the measurement system. Measurement: Sensors. Aug. 1, 2019;2:100005.*
(Continued)

*Primary Examiner* — Phu K Nguyen
(74) *Attorney, Agent, or Firm* — Alleman Hall & Tuttle LLP

(57) ABSTRACT

A tidal information display device for a movable body includes a position measurement module configured to detect a position of the movable body, a geographical information selection module configured to determine geographic information to be displayed on a display screen based on the detected position, a tidal information module configured to receive and store tidal information based on the detected position, and a tidal information display module configured to generate display data for displaying a graphical user interface (GUI) at a predetermined position on the display screen. The GUI is configured for showing the tidal information including at least one of: a present height of a tide, a high tide time, a low tide time, and a position of the tide.

18 Claims, 4 Drawing Sheets

(51) Int. Cl.
  *B63B 79/15* (2020.01)
  *G06F 3/04817* (2022.01)
  *G06F 3/04842* (2022.01)
  *G06F 3/04847* (2022.01)

(52) U.S. Cl.
  CPC ...... *G06F 3/04842* (2013.01); *G06F 3/04847* (2013.01); *B63B 2213/02* (2013.01)

(58) Field of Classification Search
  CPC ............. G06F 3/04847; G06F 3/04842; G06F 3/04817; G04B 19/266
  USPC .......................................................... 345/418
  See application file for complete search history.

(56) References Cited

U.S. PATENT DOCUMENTS

| | | | | |
|---|---|---|---|---|
| 7,268,703 | B1 * | 9/2007 | Kabel | G01C 21/203 |
| | | | | 340/984 |
| 9,401,049 | B2 | 7/2016 | Kim et al. | |
| 9,405,445 | B2 * | 8/2016 | Carnevali | G09B 29/007 |
| 9,465,581 | B2 * | 10/2016 | Chu | G01W 1/00 |
| 9,945,673 | B2 * | 4/2018 | Carnevali | G01C 21/203 |
| 10,029,769 | B2 * | 7/2018 | Truluck | B63B 49/00 |
| 11,136,097 | B2 * | 10/2021 | Sandberg | B63B 79/15 |
| 11,215,458 | B2 * | 1/2022 | Lucas | G01C 21/14 |
| 11,729,492 | B2 * | 8/2023 | Seike | G08G 3/02 |
| | | | | 348/207.99 |
| 11,852,476 | B2 * | 12/2023 | Nishiyama | G01C 21/203 |
| 11,879,733 | B2 * | 1/2024 | Okuda | G01C 13/006 |
| 2014/0160165 | A1 | 6/2014 | Kim et al. | |
| 2021/0156692 | A1 * | 5/2021 | Moriwaki | B63B 79/15 |
| 2021/0185238 | A1 | 6/2021 | Seike et al. | |

FOREIGN PATENT DOCUMENTS

| | | |
|---|---|---|
| WO | 2020045601 A1 | 3/2020 |
| WO | 2020045602 A1 | 3/2020 |
| WO | 2020061545 A1 | 3/2020 |

OTHER PUBLICATIONS

Hibbert A, Royston SJ, Horsburgh KJ, Leach H, Hisscott A. An empirical approach to improving tidal predictions using recent real-time tide gauge data. Journal of Operational Oceanography. Jan. 2, 2015;8(1):40-51.*
Li S, Liu L, Cai S, Wang G. Tidal harmonic analysis and prediction with least-squares estimation and inaction method. Estuarine, Coastal and Shelf Science. May 1, 2019;220:196-208.*
Pan H, Li B, Xu T, Wei Z. Subseasonal tidal variability in the gulf of tonkin observed by multi-satellite altimeters and tide gauges. Remote Sensing. Jan. 12, 2023;15(2):466.*
Hart-Davis MG, Piccioni G, Dettmering D, Schwatke C, Passaro M, Seitz F. EOT20: A global ocean tide model from multi-mission satellite altimetry. Earth System Science Data. Aug. 10, 2021;13(8):3869-84.*
Piccioni G, Dettmering D, Schwatke C, Passaro M, Seitz F. Design and regional assessment of an empirical tidal model based on FES2014 and coastal altimetry. Advances in Space Research. Jul. 15, 2021;68(2):1013-22.*
Birol F, Fuller N, Lyard F, Cancet M, Nino F, Delebecque C, Fleury S, Toublanc F, Melet A, Saraceno M, Léger F. Coastal applications from nadir altimetry: Example of the X-TRACK regional products. Advances in Space Research. Feb. 15, 2017;59(4):936-53.*
Katu U, Zubair A, Ak S. Tidal sea water measurement monitoring system. International Journal of Civil Engineering and Technology. Feb. 18, 2020;11(2).*
Slingsby J, Scott BE, Kregting L, McIlvenny J, Wilson J, Couto A, Roos D, Yanez M, Williamson BJ. Surface characterisation of kolk-boils within tidal stream environments using UAV imagery. Journal of Marine Science and Engineering. Apr. 30, 2021;9(5):484.*
Steccanella L, Bloisi DD, Castellini A, Farinelli A. Waterline and obstacle detection in images from low-cost autonomous boats for environmental monitoring. Robotics and Autonomous Systems. Feb. 1, 2020;124:103346.*
Qiao D, Liu G, Lv T, Li W, Zhang J. Marine vision-based situational awareness using discriminative deep learning: A survey. Journal of Marine Science and Engineering. Apr. 2021;9(4):397.*
Bloisi DD, Previtali F, Pennisi A, Nardi D, Fiorini M. Enhancing automatic maritime surveillance systems with visual information. IEEE Transactions on Intelligent Transportation Systems. Aug. 9, 2016;18(4):824-33.*
García-Valdovinos LG, Salgado-Jiménez T, Bandala-Sánchez M, Nava-Balanzar L, Hernández-Alvarado R, Cruz-Ledesma JA. Modelling, design and robust control of a remotely operated underwater vehicle. International Journal of Advanced Robotic Systems. Jan. 9, 2014;11(1):1.*
Ocean Industries Concept Lab AHO, (AHO1), How to create an AR design system, Jul. 27, 2020; https://www.youtube.com/watch?v=RShopclaawl.*
Ocean Industries Concept Lab AHO, (AHO2), Using OpenBridge for autonomous vessel control user interface, Jun. 26, 2020; https://www.youtube.com/watch?v=uuZ0k0TPGKg.*
MyTIMEZERO, Discover TZ Navigator | Marine Navigation Software, https://mytimezero.com/tz-navigator, Feb. 10, 2017, https://www.youtube.com/watch?v=rXqRq5UtB3w&t=342s.*
Ding, Yan, Y. X. Zhang, and Y. F. Jia. "CCHE2D-Coast: Model description and graphical user interface." NCCHE Technical Report (2016): 88.*
European Patent Office, Extended European Search Report Issued in Application No. 21172316.8, Oct. 13, 2021, 10 pages.
European Patent Office, Office Action Issued in Application No. 21172316.8, May 2, 2025, 5 pages.
Windy.com, "Windy—how to open tide information," Facebook, Available Online at https://www.facebook.com/windyforecast/videos/2144979622396826/, Mar. 13, 2018, 2 pages.
Multiple authors, "Tide times," Windy Community, Available Online at https://community.windy.com/topic/8509/tide-times, May 25, 2019, 2 pages.

* cited by examiner

TIDAL INFORMATION DISPLAY DEVICE

CROSS-REFERENCE TO RELATED APPLICATION(S)

The application claims priority under 35 U.S.C. § 119 to European Patent Application No. EP21172316.8, which was filed in Europe on May 5, 2021, the entire disclosure of which is hereby incorporated by reference in its entirety.

TECHNICAL FIELD

The present disclosure mainly relates to a tidal information display device, and more specifically to superimposing tidal information on an image for navigation of a water vessel using augmented reality.

BACKGROUND

Tides have been known to influence a course of the marine vessel on water. Vessel navigating personnel, for example, a captain, crew, or other navigating personnel on-board the marine vessel may be unaware of when and how each tide may influence the course of the marine vessel. For example, in waters where tides may, or stated differently—are likely to, be encountered by the marine vessel, a position, direction and/or time at which the tides can occur may be unknown by the vessel navigating personnel and consequently, the vessel navigating personnel may be forced to choose or elect a sub-optimal course of travel for the marine vessel in such waters. Depending on a severity of, or by simply encountering, these tides over a prolonged period of time, these tides may contribute in negatively impacting a structural integrity and/or an operational performance of the marine vessel.

Some Augmented Reality (AR) based navigation systems have been developed in the past for assisting in the navigation of marine vessels. These systems have been known to traditionally depict tidal information graphically, that is, by way, or use, of one or more graphs. However, with this approach of displaying tidal information graphically, additional display devices, separate from those used to display maritime charts or geographical maps, may be needed to display these graphs thereby increasing costs while also continuing to remain counter-productive to, and inefficient in, the use of these display devices for the purposes of navigating the ship. In fact, even if these graphs were to be displayed on a pre-designated area of the same display device as that used for displaying charts, it is well known that displaying these graphs with sufficient legibility i.e., for facilitating the easy use of such graphs by navigating personnel, may entail that an amount of the area on the display device designated for such display of the graph/s would need to be relatively large enough even with the use of most modern large sized display devices especially for maintaining convenience to the navigating personnel of the ship. Nevertheless, by presenting the tidal information graphically, these graphs can continue to remain less intuitive to the navigating personnel in that the navigating personnel may need to keenly observe and interpret these graphs based on the information in the observed graphs. Such keen observation and interpretation of the graphs by the navigating personnel may be slow, tedious, and cumbersome while also contributing to causes of fatigue besides delaying and/or rendering the navigating personnel with poor and/or ineffective decision making for purposes of subsequent navigation of the ship.

Moreover, when a ship intends to navigate around tidal zones of water bodies, the ship can obtain tidal information from various sources, for example, using on-board sensing equipment or from an external source with use of a communication means such as satellite communication. However, even with the tidal information from these sources, the information from each of these sources is not fully integrated by many of the conventionally designed navigation systems for display in an effective manner and is therefore, rendered sub-optimal for intuitive use by navigating personnel.

Conventional Augmented Reality (AR) based navigation systems can display image information captured by an image sensor (camera) and information about surrounding ships and land acquired based on information captured by a sensor such as a radar, however, it is difficult to display the tidal information by the conventional AR navigation system because the tidal information is not necessarily obtained by the sensor of the own vessel, but also from an external base through the communication equipment. In the current state of the art, there does not exist an AR based display system for navigation that is able to display tidal information, especially when it is provided from a source other than one's own vessel, in a manner that can be intuitively grasped by the navigating personnel for use in navigating the ship.

For the aforementioned reasons, there is a need for providing a system and method that displays tidal information on a display screen for assisting in the navigation of a marine vessel.

SUMMARY

In an embodiment of the present disclosure, there is provided a tidal information display device, for a movable body, that includes a position measurement module, a geographical information selection module, a tidal information receiving module, and a tidal information display module. The position measurement module is configured to detect a position of the movable body. The geographical information selection module is configured to determine geographic information to be displayed on a display screen based on the detected position. The tidal information receiving module is configured to receive and store tidal information based on the detected position. The tidal information display module is configured to generate display data for displaying a graphical user interface (GUI) at a predetermined position on the display screen, the GUI configured for showing the tidal information including at least one of: a present height of a tide, a high tide time, a low tide time, and a position of the tide.

Additionally, or optionally, the GUI is a pop-up balloon.

Additionally, or optionally, the tidal information display module is configured to generate the display data for displaying the pop-up balloon on the display screen, when a condition is met, the condition includes at least one of: when a user performs a click operation, when the predetermined position is within a predetermined range from the detected position of the movable body, and when a number of GUIs on the image falls below a predetermined minimum threshold.

Additionally, or optionally, the tidal information display module is configured to superimpose a minimized version of the GUI on the image that includes a mini-gauge to indicate a height and direction of the tide.

Additionally, or optionally, the tidal information display module is configured to generate the display data for displaying a gauge in the GUI for indicating the present height of the tide, the high tide time, the low tide time, and the position of the tide.

Additionally, or optionally, the tidal information display module is configured to generate the display data for displaying a triangle-shaped indicator on a periphery of the gauge, wherein a direction of the triangle-shaped indicator indicates a moving direction of the tide vis-à-vis the height of the tide.

Additionally, or optionally, the triangle-shaped indicator is configured to move along the periphery of the gauge for indicating time left for at least one of: a high tide condition and a low tide condition to occur at the predetermined position based on the detected position of the moveable body.

Additionally, or optionally, the predetermined position is at least one of: a port position, a pre-set position, one or more way-points (WP) set by a user, and predicted position.

Additionally, or optionally, the geographic information is one of: a geographical map and an image captured by an image sensor attached to the movable body.

Additionally, or optionally, the tidal information display module is configured to superimpose the GUI on the image at the predetermined position, and generate the display data for displaying the superimposed image on the display screen.

Additionally, or optionally, the tidal information receiving module is configured to receive the tidal information from one of: an external communication equipment and one or more sensors attached to the movable body.

Additionally, or optionally, the tidal information display module is configured to maximize or minimize at least one of: the GUI and the mini-gauge, when a condition is met, the condition includes at least one of: when a user performs a click operation, when the predetermined position exceeds a predetermined range from the detected position of the movable body, and when a number of GUIs on the image exceeds above a predetermined minimum threshold.

In another aspect of the present disclosure, there is provided an augmented reality (AR), based navigation apparatus for a movable body, that includes an image sensor, a position measurement module, a geographical information selection module, a tidal information receiving module, and a tidal information display module. The image sensor is attached onto the movable body, and configured to capture an image, and output image data. The position measurement module is configured to detect a position of the movable body. The geographical information selection module is configured to determine the image to be displayed on a display screen based on the detected position. The tidal information receiving module is configured to receive and store tidal information based on the detected position. The tidal information display module is configured to generate a graphical user interface (GUI) corresponding to a predetermined position on the display screen, the GUI showing the tidal information including at least one of: a present height of a tide, a high tide time, a low tide time, and a position of the tide, superimpose the GUI on the image at the predetermined position, and generate display data for displaying the superimposed image on the display screen.

Additionally, or optionally, the GUI is a pop-up balloon.

In yet another aspect of the present disclosure, there is provided a method for displaying tidal information for a movable body, on an image displayed on a display screen. The method includes capturing an image by an image sensor attached to a movable body, detecting a position of the movable body, determining the image to be displayed on a display screen based on the detected position, receiving and storing tidal information based on the detected position, generating a graphical user interface (GUI) corresponding to a predetermined position on the display screen, the GUI showing the tidal information including at least one of: a present height of a tide, a high tide time, a low tide time, and a position of the tide, superimposing the GUI on the image at the predetermined position, and generating display data for displaying the superimposed image on the display screen.

In yet another aspect of the present disclosure, there is provided a non-transitory computer readable medium having stored thereon computer-executable instructions which, when executed by a computer, cause the computer to capture an image by an image sensor attached to a movable body, detect a position of the movable body, determine the image to be displayed on a display screen based on the detected position, receive and store tidal information based on the detected position, generate a graphical user interface (GUI) corresponding to a predetermined position on the display screen, the GUI showing the tidal information including at least one of: a present height of a tide, a high tide time, a low tide time, and a position of the tide, superimpose the GUI on the image at the predetermined position, and generate display data for displaying the superimposed image on the display screen.

In the above-mentioned embodiments of the present disclosure, there is provided processing circuitry included in a tidal information display device or in an augmented reality (AR) based navigation apparatus for a movable body, that includes: a position measurement module, a geographical information selection module, a tidal information receiving module, and a tidal information display module, and any function of each module shall be performed by the processing circuitry.

The problem of not being able to display tidal information that can be intuitively used by the navigating personnel of the ship is solved by using a tidal information display device that depicts the tidal information pictorially, as opposed to graphically. Also, the tidal information display device eliminates the need for, or use of, separate display devices for displaying different types of information pertaining to tides by integrating the tidal information onto the same display screen. In fact, tidal information display device of the present disclosure can beneficially, or stated differently—advantageously offer to present the tidal information to the navigating personnel for use in a highly intuitive manner as opposed to otherwise requiring keen observation typically encountered with the use of graphs or other similar approaches.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

DETAILED DESCRIPTION OF THE EMBODIMENTS

Figure 1:
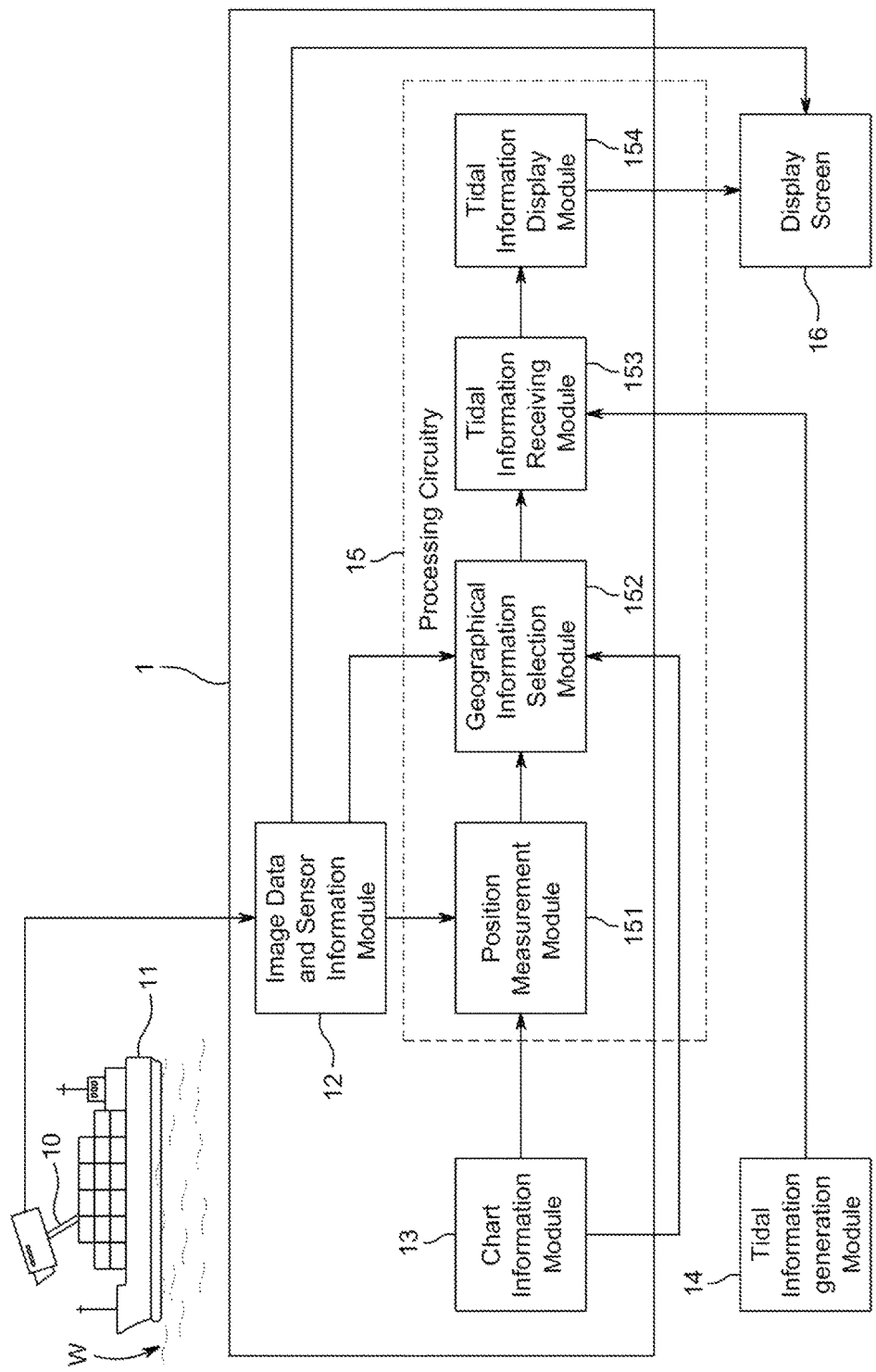
FIG. 1 is a block diagram illustrating an entire configuration of a tidal information display device for a movable body in which an image sensor is attached to the movable body according to one embodiment of the present disclosure.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 2:
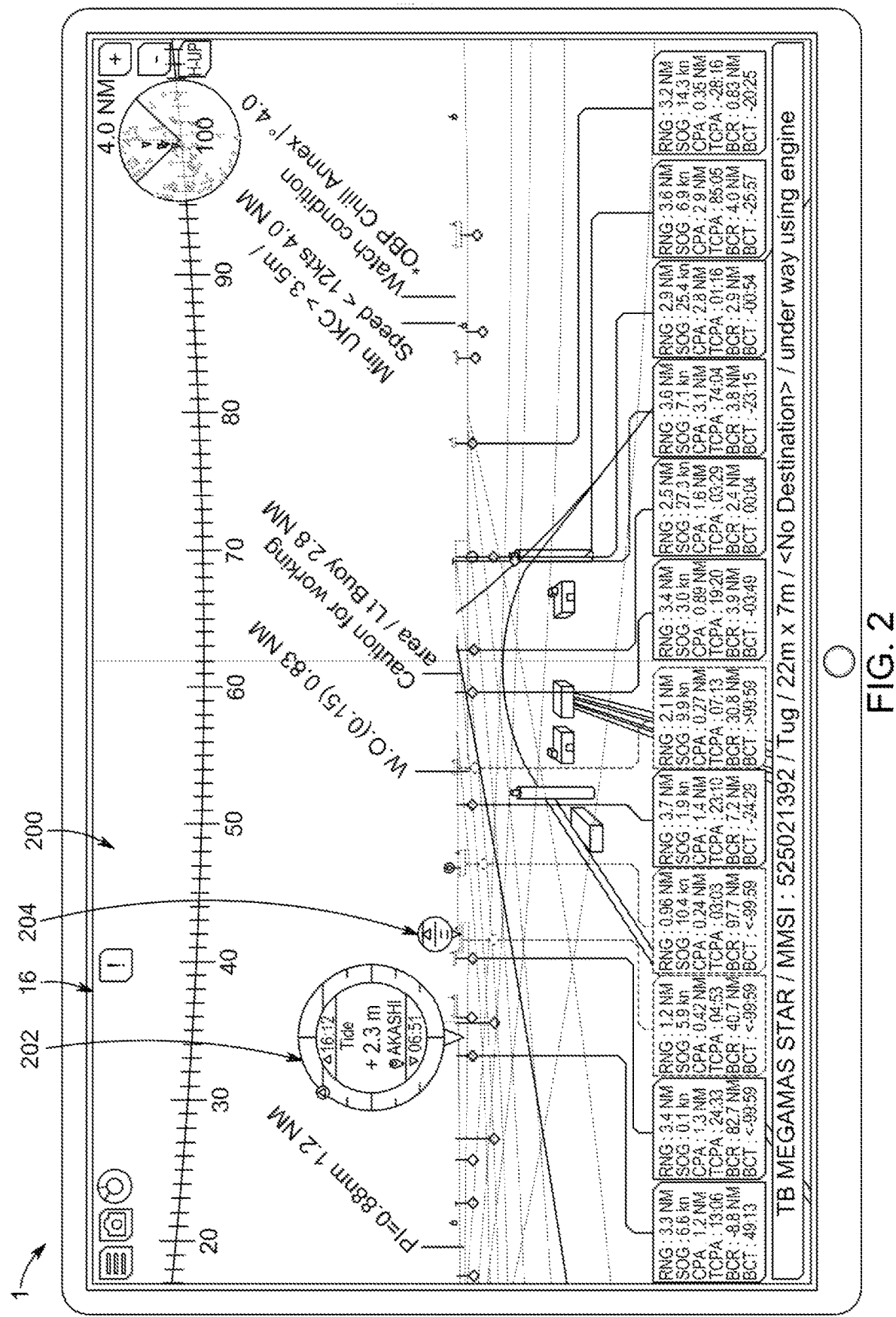
FIG. 2 illustrates a superimposed camera image of a region including the movable body and showing a GUI superimposed on a pre-determined position of a tide on the image.
Figure 3:
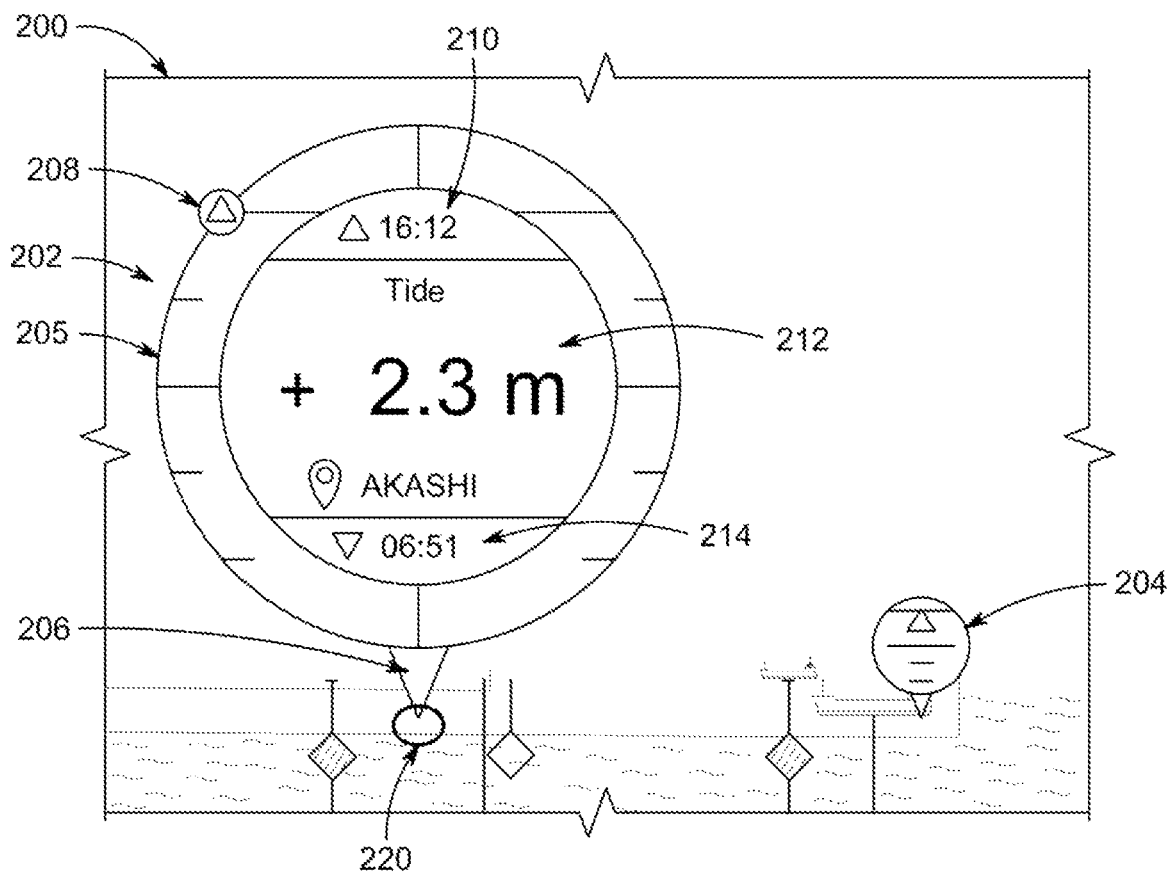
FIG. 3 illustrates an enlarged view of the superimposed image showing various information presented by the GUI and another minimized version of the GUI as a mini-gauge.

FIG. 1 is a block diagram illustrating an entire configuration of a tidal information display device 1 in which an image sensor 10 is attached to a movable body 11 according to one embodiment of the present disclosure. FIG. 2 illustrates a superimposed camera image 200 of a region including the movable body 11 and showing a GUI 202 superimposed on a pre-determined position of a tide 220 on the image 200. FIG. 3 illustrates an enlarged view of the superimposed image 200 showing various information presented by the GUI 202, another GUI 204 as a mini-gauge that is similar to a minimized version of the GUI 202, and a position of the tide 220.

Next, mainly referring to FIG. 1, the image sensor 10 (hereinafter also referred to as camera 10) may be attached to the movable body 11 (hereinafter also referred to as ship 11).

The tidal information display device 1 may be located on-board the ship 11 and provided with, or in electrical connection to, the camera 10 as the ship instrument for purposes as will be explained in detail later herein.

The camera 10 may be configured as, for example, a limited-viewing angle or a wide-angle video camera which images the water surface W in the vicinity, or around at least a portion of the perimeter of the ship 11. This camera 10 may have a live output function, capable of generating video data (image data) as the imaged result in real time, and outputting it to a display screen 16. As illustrated in FIG. 1, the camera 10 may be installed in the ship 11 so that an imaging direction generally faces onto the water surface W forward of the hull.

The camera 10 may be attached to the ship 11 through a rotating mechanism (not illustrated) and, therefore, the imaging direction can be changed in a given angle range on the basis of the hull of the ship 11, for example, by inputting one or more commands via the tidal information display device 1 for instructing a panning/tilting of the camera 10.

The tidal information display device 1 may be provided with, or be communicatively coupled to, the display screen 16 for generating an image 200 expressing the situation around the movable body 11 using Augmented Reality (AR) based on, among other things, a detected position of the ship 11 as will be explained later herein, and superimposing a GUI 202/204 on the image 200 corresponding to a pre-determined position of a tide on the image.

The display screen 16 may be configured as, for example, a display screen that forms part of a navigation assisting device to which a ship operator who operates the ship 11 refers. However, the display screen 16 is not limited to the above configuration, and, for example, it may be a display screen for a portable computer which is carried by a ship operator's assistant who monitors the surrounding situation from the ship 11, a display screen for a passenger to watch in the cabin of the ship 11, or a display part for a head mounted display, such as a wearable glass, worn by a passenger. In an embodiment of the present disclosure, the camera 10, a tidal information generation module 14, and the display screen 16 are external to the display device 1. In another embodiment of the present disclosure, the camera 10, the tidal information generation module 14, and the display screen 16 are an integral part of the display device 1. Alternatively, the camera 10, the tidal information generation module 14, the display screen 16 and the tidal information display device 1 may integrally form an Augmented Reality (AR) based navigation apparatus that autonomously, or at least semi-autonomously facilitates a user to, navigate the ship 11 across the sea. The AR based navigation apparatus enables the user to navigate the ship by superimposing live tidal information on live images of surroundings of the ship in a manner which is easy for a user to comprehend.

The tidal information display device 1 may also be connected to variety of peripheral devices including, but not limited to, a keyboard and a mouse which the user may operate for performing various functions pursuant to functionalities in the present disclosure. For example, the user can provide various kinds of instructions to the tidal information display device 1 and the camera 10 about generation of an image by operating the keyboard and/or the mouse. The instructions may include the pan/tilt operation of the camera 10, setting of displaying or not-displaying of various types of information, and a setup of a viewpoint from which the image is captured.

The tidal information display device 1 may further be connected to a tidal information generation module 14 that is configured to generate tidal information including position of a tide on the water surface (W). The tidal information generation module 14 may include an external communication equipment, for example, a land station, a Global Navigation Satellite System (GNSS) receiver, an Electronic Chart Display and Information System (ECDIS), an Automated Identification System (AIS) receiver, a radar device etc. In addition to the position of the tide, the tidal information further includes a present height of the tide, a high tide time and a low tide time for a given tide. Additionally, or optionally, the tidal information generation module 14 may include one or more sensors attached to the ship 11. These sensors may include GNSS receivers, AIS systems, or other peripheral devices that form part of the on-board ship equipment for detecting tides and/or measuring their pertinent tidal information. The tidal information generating module 14 is configured to generate the tidal information with respect to a reference axis of the map 200, which means that the tidal information generation module 14 is configured to store chart/global co-ordinates of the tides in the region.

Additionally, or optionally, as shown in FIG. 1, the tidal information display device 1 may include an image data and sensor information module 12, and a chart information module 13 for realizing functionalities that are consistent with the present disclosure.

With continued reference to FIG. 1, the tidal information display device 1 includes processing circuitry 15. The image data and sensor information module 12 may be configured to receive an image captured by the image sensor 10, and output the image data to the display screen 16. Further, the image data and sensor information module 12 may also be configured to receive and store image sensor information including a position and an azimuthal orientation of the image sensor 10 with respect to a reference axis of a global geographical map. The image sensor 10 is installed on the ship 11. While capturing images (and for sake of clarity in this disclosure), a position of the image sensor 10 may be assumed to be deduced from, for example, a position of the ship 11 in the map and the azimuthal orientation of the image sensor 10 may be assumed from, for example, a heading direction of the ship 11 with respect to a meridian plane.

The processing circuitry 15 of the tidal information display device 1 includes a position measurement module 151 that is configured to detect the position of the ship 11. To do so, the position measurement module 151 may receive the positional information of the ship 11 from the chart information receiving module 13. The chart information module 13 may be configured to receive and store the global geographical map, or another specified geographical map, for the region based on electronic nautical chart information that may be known beforehand to the chart information module 13.

The position measurement module 151 is configured to detect the position of the ship 11 via any external equipment, for example, a land station or an on-board sensing system such as, but not limited to, a Global Navigation Satellite System (GNSS) receiver, an Electronic Chart Display and Information System (ECDIS), an Automated Identification System (AIS) receiver, a radar device, a sonar etc.

A geographical information selection module 152 is configured to determine geographic information to be displayed on the display screen 16 based on the position of the ship 11 detected by the position measurement module 151. In one embodiment, the geographic information may include the geographical map of a region including the ship, or a geographical map of a region corresponding to a field of view of the image sensor 10. In another embodiment, the geographic information may include the image captured by the image sensor 10 that is attached to the ship 11.

A tidal information receiving module 153 is configured to receive and store tidal information based on the detected position of the ship 11. The tidal information receiving module 153 may be disposed in communication with the tidal information generation module 14 to receive relevant tidal information based on the position of the ship 11 detected by the position measurement module 151.

Referring to FIGS. 1, 2 and 3, a tidal information display module 154 is configured to generate display data for displaying a graphical user interface (GUI) 202 on the display screen 16 at a predetermined position, explanation to which i.e., the predetermined position will be made later herein. The GUI 202 is configured for showing the tidal information including at least one of: a present height of a tide, a high tide time, a low tide time, and the position of the tide.

In one embodiment, as illustrated in FIGS. 2 and 3, the GUI 202 is a pop-up balloon. In this embodiment, the tidal information display module 154 is configured to generate the display data for displaying the pop-up balloon on the display screen 16 when a condition is met. In a further embodiment, the condition is met when a user performs a click operation. The term 'click operation' disclosed herein may be performed by the user using a tactile interface on the display screen 16 of the display device 1, or alternatively, by use of other peripheral devices, for example, an input receiving module (not shown) such as a keyboard or a mouse that may be connected to the display device. The user may request the display device 1 to display the GUI 202 to be displayed on the predetermined position that corresponds to a tide in the image 200 obtained from the image sensor 10.

In another embodiment, the GUI 202 may be configured to appear on the image 200 corresponding to the predetermined position of the tide when the predetermined position of the tide is within a predetermined range, for example, less than 5 nautical miles, from the detected position of the ship 11.

In yet another embodiment, the GUI 202 may be displayed when a number of GUIs on the image falls below a predetermined minimum threshold, for example, less than 3 GUIs corresponding to when three tides may be present in the region and the image 200, captured by the image sensor 10, correspondingly shows the three tides but has tidal information pertaining to one or more of the three tides missing therefrom.

Additionally, the tidal information display module 154 may also be configured to superimpose a minimized version of the GUI (as denoted by reference numeral 204 in the views of FIGS. 2 and 3 respectively) on the image 200 that includes a mini-gauge to indicate a height and direction of the tide. As shown in FIG. 2, a horizontal line in the mini-gauge 204 indicates the height of the tide and a triangle in the mini-gauge 204 also works as the triangle-shaped indicator 208. Referring mainly to FIG. 1, in embodiments herein and also as best shown in the view of FIG. 2, the tidal information display module 154 is generally configured to superimpose the GUI 202 (and the minimized version of the GUI 204) on the image 200 and display the superimposed image 200 on the display screen 16.

The tidal information display module (154) is configured to maximize or minimize at least one of: the GUI (202) and the mini-gauge (204), when a condition is met, the condition includes at least one of: when a user performs a click operation, when the predetermined position exceeds a predetermined range from the detected position of the movable body (11), and when a number of GUIs on the image exceeds above a predetermined minimum threshold.

Referring to FIG. 1 and as shown best in the enlarged view of the image 200 in FIG. 3, the tidal information display module 154 is also configured to generate the display data for displaying a gauge 205 in the GUI 202 for indicating the present height of the tide, the high tide time, the low tide time, and the position of the tide. In fact, as shown, an upper portion 210 of the gauge 205 depicts the time at which the high tide condition would prevail at the predetermined position of the tide. Similarly, the time at which the low tide condition would prevail at the predetermined position of the tide is depicted by a lower portion 214 of the gauge 205. Further, the present height of the tide at the predetermined position may be displayed by, or within, a central region 212 of the gauge 205. The central region 212 of the gauge 205 may be configured to display other types of tidal information such as, but not limited to, global geographical co-ordinates for the predetermined position of the tide, local co-ordinates for the predetermined position of the tide based on the predetermined position of the tide, or simply a name of the predetermined position, if available from the map, for example, a name of a port such as 'Akashi' as shown within the central region 212 of the gauge 205. As such, the gauge also has a pointer 206 that is rendered dynamically by the tidal information display module 154 for pointing in the direction of the tide on the image 200 so that the user, for example, navigating personnel using the display device 1 can quickly and readily know a position of the tide in relation to the ship 11, and the associated concomitant tidal information from a remainder of the gauge 205 i.e., the upper portion 210, the central portion 212, and the lower portion 214 of the gauge 205.

Moreover, with continued reference to FIG. 1 and as shown best in the view of FIG. 3, the tidal information display module 154 is also configured to generate the display data for displaying a triangle-shaped indicator 208 on a periphery of the gauge 205 such that a direction of the triangle-shaped indicator 208 indicates a moving direction of the tide vis-à-vis the height of the tide i.e., upwards or downwards based on a difference between the present height of the tide (as shown by the central region 212 of the gauge 205) and a height of the tide that would likely occur with passage of time from a current time to a time when the high tide condition or the low tide condition prevails as shown by the upper and lower portions 210, 214 of the gauge 205 respectively.

For example, FIG. 3 shows the triangle-shaped indicator 208 in upper left quadrant of the gauge 205, indicating that while the current/present height of the tide is 2.3 meters higher than mean sea level, approximately 80% or 90% of the time has lapsed in the ongoing rise in the height of the tide while the tide is continuing to move into the high tide condition that is predicted, and likely, to occur at 1612 hours (or at 4:12 p.m. as per 12-hour time format).

In an embodiment herein, the triangle-shaped indicator 208 is also configured to move along the periphery of the gauge 205 for indicating time left for at least one of: a high tide condition and a low tide condition to occur at the predetermined position of the tide based on the detected position of the ship 11. Accordingly, in the foregoing example, it is likely that the triangular-shaped indicator 208 would move into a 12 o'clock position when it is 1612 hours at which time the high tide condition has been predicted, or tidal information with such prediction has been, recorded by the external source such as a land station and, received at the tidal information receiving module 14 unless other factors, for instance, other environmental factors also received at the tidal information receiving module 14 has been updated, or modified vis-à-vis the source, to provide new tidal information that is different from the tidal information received earlier i.e., at a previous time, and such updated tidal information changes, or revises, the timing at which the high tide condition or the low tide condition would prevail at the predetermined position of the tide.

Accordingly, in the foregoing example, if the triangular-shaped indicator 208 has moved past the 12 o'clock position on the gauge 205, then the triangular-shaped indicator 208 may proceed towards a 6 o'clock position at a time, for example, 0651 hours (or 6:51 a.m. as per 12-hour time format) to denote that the tide will be receding in height until 6:51 a.m. at which time, the low tide condition would prevail at the predetermined position of the tide.

In an embodiment, the predetermined position displayed on the gauge 205 is a port position. Accordingly, coordinates (global or local), or alternatively, a name of the port, for example, 'Akashi' as shown in the view of FIG. 2 or another port's name may be displayed by the central region 212 of the gauge 205. In another embodiment, the predetermined position may include a pre-set position, for example, a geographical location in the sea. In yet another embodiment, the predetermined position may include one or more way-points (WP) set by a user. For example, these group or set of way-points may be located on a course that the ship 11 is intended to travel on. In yet another embodiment, the pre-determined position may include a predicted position, for example, a vector based pre-calculated position on the image 200 to correspond with a possible tide location and as requested by the user of the display screen 16. The predicted position may be calculated based on a speed and a direction of the ship 11 in consideration with a current velocity of the ship 11 using any known conventional technique.

With implementation of embodiments herein, the tidal information display module 154 outputs the GUIs 202 and 204 to the display screen 16 to superimpose the symbols 202 and 204 on the image 200 captured by the image sensor 10 and display the superimposed image to provide visual information about positions of, and the pertinent tidal information, associated with each of the tides with respect to sea surface and based on the detected position of the ship 11 in a manner that is easy for a user to comprehend.

In the context of the present disclosure, the processing circuitry 15 includes a processor, computer, microcontroller, or other circuitry that controls the operations of various components such as an operation panel, and a memory. The processing circuitry 15 may execute software, firmware, and/or other instructions, for example, that are stored on a volatile or non-volatile memory, or otherwise provided to the processing circuitry 15.

Although the GUIs 202, 204 are shown to correspond with respective ones of two selected tides on the image 200, it would be apparent to one of ordinary skill in the art that based on the geographical information at the geographical information selection module 152 and the tidal information at the tidal information receiving module 153, the tidal information display module 154 may select more than or less than two tides and superimpose the selected more than or less than two tides with appropriate GUIs as opposed to that exemplarily shown in the view of FIGS. 2 and 3 respectively.

A scope of the on-board ship equipment (information source for the position measurement module 151 and/or the geographical information selection module 152) connected to the display device 1 is not limited to any of the configurations that have been disclosed herein, and other types of instruments may be included to form part of the on-board ship equipment without limiting the scope of the present disclosure.

Further, the present disclosure is applicable not only to the ship which travels on the sea, but may also be applicable to arbitrary water-surface movable bodies which can travel, for example, on a lake, or a river.

Figure 4:
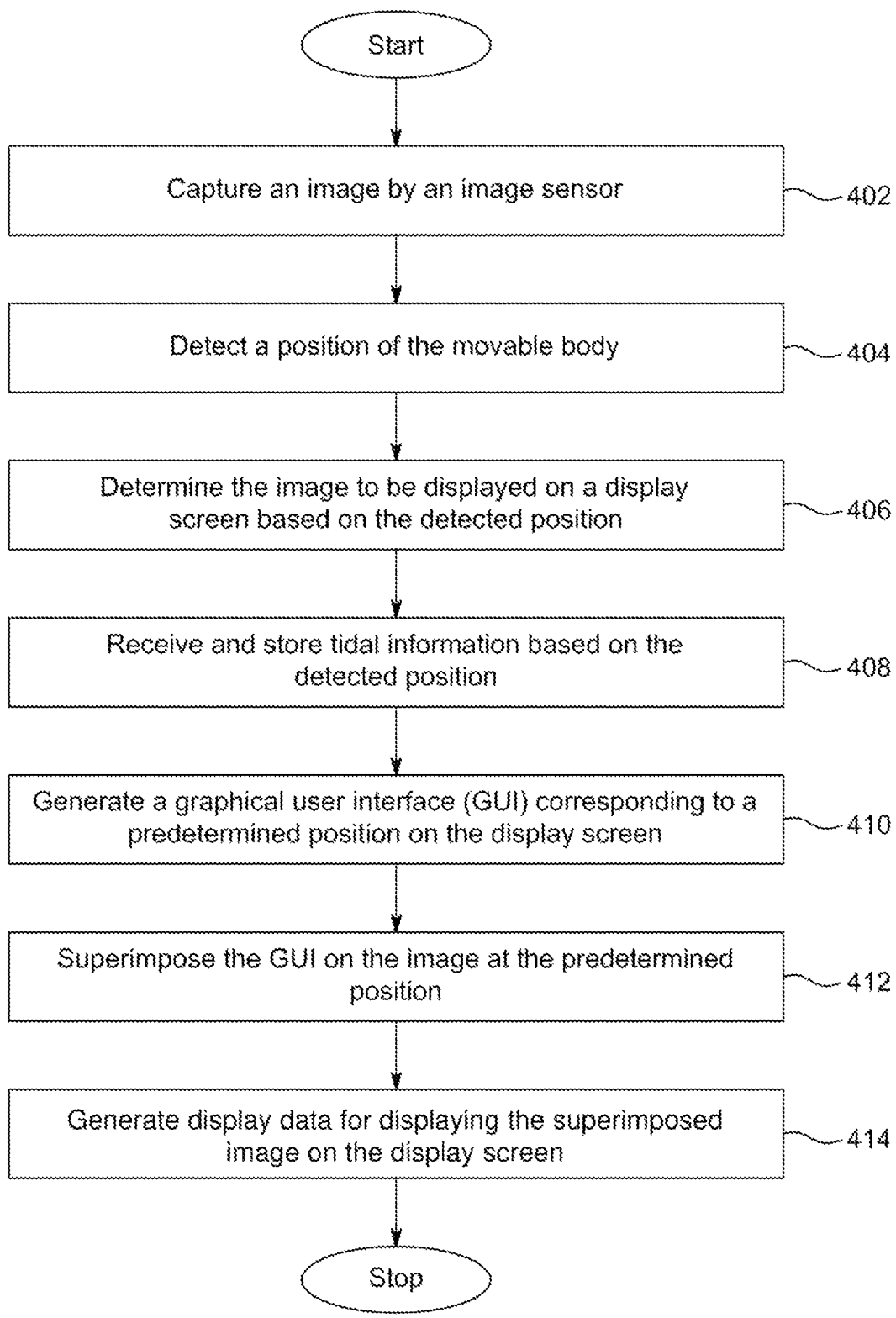
FIG. 4 is a flowchart illustrating a method for superimposing tidal information on an image displayed on a display screen, in accordance with an embodiment of the present disclosure.

FIG. 4 is a flowchart illustrating a method 400 for displaying tidal information for a movable body on an image displayed on a display screen.

At step 402, the image sensor 10 is configured to capture an image, and output image data.

At step 404, the position measurement module 151 is configured to detect a position of the movable body.

At step 406, the geographical information selection module 152 is configured to determine the image to be displayed on the display screen 16 based on the detected position.

At step 408, the tidal information receiving module 153 is configured to receive and store tidal information based on the detected position.

At step 410, the tidal information display module 154 is configured to generate a graphical user interface (GUI) corresponding to a predetermined position on the display screen 16, the GUI showing the tidal information including at least one of: a present height of a tide, a high tide time, a low tide time, and a position of the tide.

At step 412, the tidal information display module 154 is further configured to superimpose the GUI on the image at the predetermined position.

At step 414, the tidal information display module 154 is configured to generate the display for displaying the superimposed image on the display screen 16.

Terminology

Not all objectives or effects/advantages can be achieved in accordance with any particular embodiment described herein. Thus, for example, those skilled in the art will appreciate that certain embodiments will be taught herein without necessarily achieving other objectives or effects/advantages as taught or suggested herein. You will conclude that it may be configured to work to achieve or optimize one or more effects/benefits.

All processes described herein can be embodied by software code modules executed by a computing system that includes one or more computers or processors and can be fully automated. The code modules can be stored on any type of non-transitory computer-readable medium or other computer storage device. Some or all methods may be embodied in dedicated computer hardware.

It is clear from the present disclosure that there are many other variations other than those described herein. For example, depending on the embodiment, any particular action, event, or function of any of the algorithms described herein may be performed in different sequences and may be added, merged, or excluded altogether. (For example, not all described actions or events are required to execute the algorithm). Moreover, in certain embodiments, operations or events are performed in parallel rather than sequentially, for example through multithreading, interrupt handling, or through multiple processors or processor cores, or on other parallel architectures. Can be done. In addition, different tasks or processes can be performed by different machines and/or computing systems that can work together.

The various exemplary logical blocks and modules described in connection with the embodiments disclosed herein can be implemented or executed by a machine such as a processor. The processor may be a microprocessor, but instead, the processor may be a controller, a microcontroller, or a state machine, or a combination thereof. The processor can include an electrical circuit configured to process computer executable instructions. In another embodiment, the processor includes an application specific integrated circuit (ASIC), a field programmable gate array (FPGA), or other programmable device that performs logical operations without processing computer executable instructions. Processors can also be a combination of computing devices, such as a digital signal processor (digital signal processor) and microprocessor combination, multiple microprocessors, one or more microprocessors in combination with a DSP core, or any other of that. It can be implemented as such a configuration. Although described primarily with respect to digital technology herein, the processor may also include primarily analog devices. For example, some or all of the signal processing algorithms described herein can be implemented by analog circuits or mixed analog and digital circuits.

Computing environments include, but are not limited to, any type of computer system that is based on a microprocessor, mainframe computer, digital signal processor, portable computing device, device controller, or computing engine within the device be able to.

Unless otherwise stated, conditional languages such as "can," "can," "will," or "potentially" include other features, elements, and/or steps in a particular embodiment. Embodiments are understood in the context commonly used to convey that they do not include. Thus, such conditional languages are generally any method in which features, elements and/or steps are required for one or more embodiments, or one or more embodiments are these features. It does not mean that the elements and/or steps are included in any particular embodiment or necessarily include logic to determine whether they are performed.

Disjunctive languages, such as the phrase "at least one of X, Y, Z," have items, terms, etc. of X, Y, Z, or any combination thereof, unless otherwise stated. It is understood in the context commonly used to indicate that it can be (e.g. X, Y, and Z). Thus, such a disjunctive language generally requires at least one of X, at least one of Y, or at least one of Z, each of which has a particular embodiment.

Any process description, element or block in the flow diagram described herein and/or shown in the accompanying drawings is one or more executable instructions for implementing a particular logical function or element in the process. Should be understood as potentially representing a module, segment, or part of code, including. Alternative embodiments are included within the scope of the embodiments described herein, where the element or function is substantive, depending on the functionality involved, as will be appreciated by those skilled in the art. Can be performed simultaneously or in reverse order, deleted from those illustrated or described, in no particular order.

Unless otherwise stated, a numeral such as "one" should generally be construed as containing one or more described items. Thus, terms such as "one device configured to" are intended to include one or more listed devices. One or more of such enumerated devices can also be collectively configured to perform the stated citations. For example, "processors configured to run A, B, and C below" are a first processor configured to run A and a second processor configured to run B and C. Can include processors with. In addition, even if a specific number enumeration of the introduced examples is explicitly enumerated, those skilled in the art will appreciate that such enumeration is typically at least the enumerated number (eg, other modifiers). A mere enumeration of "two enumerations" without the use should be interpreted to mean at least two enumerations, or two or more enumerations).

In general, the terms used herein should generally be construed as "non-limiting" terms (e.g., the term "including" should be construed as "not only that, but at least including" and " . . . . The term "has" should be interpreted as "having at least", and the term "including" should be interpreted as "including, but not limited to,"). Those skilled in the art will judge that this is the case.

For purposes of illustration, the term "horizontal" as used herein refers to a plane or plane parallel to the floor or surface of the area in which the system being described is used, regardless of its orientation. The method to be performed is defined as the plane on which it is performed. The term "floor" can be replaced with the term "ground" or "water surface". The term "vertical/vertical" refers to the direction perpendicular/vertical to the defined horizon. Terms such as "upper", "lower", "lower", "upper", "side", "higher", "lower", "upper", "beyond", and "lower" are defined for the horizontal plane.

The terms "attach", "connect", "pair" and other related terms used herein are also intended to denote features such as being removable, movable, fixed, and adjustable, unless otherwise noted. And/or should be construed as including removable connections or connections. Connections/connections include direct connections and/or connections with an intermediate structure between the two components described.

Unless otherwise stated, numbers preceded by terms such as "approximately," "about," and "substantially," as used herein, include enumerated numbers, and further. Represents an amount close to the stated amount that performs the desired function or achieves the desired result. For example, "approximately," "about," and "substantially" mean values less than 10% of the stated values, unless otherwise stated. As used herein, the features of the embodiments in which terms such as "approximately," "about," and "substantially" are previously disclosed perform further desired functions. Or represent a feature that has some variability to achieve the desired result for that feature.

Many modifications and modifications can be added to the embodiments described above, and their elements should be understood as being among other acceptable examples. All such modifications and modifications are intended to be included within the scope of the present disclosure and are protected by the following claims.

What is claimed is:

1. A tidal information display device for a movable body, comprising:
    processing circuitry configured:
        to detect a position of the movable body;
        to determine geographic information to be displayed on a display screen based on the detected position;
        to receive and store tidal information based on the detected position;
        to generate a graphical user interface (GUI) corresponding to a predetermined position of a tide on the display screen;
        to superimpose the GUI on an image, captured by an image sensor, at the predetermined position on the display screen; and
        to generate display data for displaying the GUI superimposed on the image at the predetermined position on the display screen, wherein
    the GUI includes a gauge that displays a present height of the tide, a high tide time, a low tide time, and indicates a position of the tide, including a graphical representation of an upwards or downwards moving direction of the tide.

2. The tidal information display device of claim 1, wherein the GUI is a pop-up balloon.

3. The tidal information display device of claim 2, wherein:
    the processing circuitry is further configured to generate the display data for displaying the pop-up balloon on the display screen, when a condition is met, the condition including at least one of:
        when a user performs a click operation,
        when the predetermined position of the tide is within a predetermined range from the detected position of the movable body, and
        when a number of GUIs on the image falls below a predetermined minimum threshold.

4. The tidal information display device of claim 3, wherein
    the predetermined position is at least one of:
        a port position,
        a pre-set position,
        one or more way-points (WP) set by a user, and
        a predicted position.

5. The tidal information display device of claim 2, wherein
    the predetermined position is at least one of:
        a port position,
        a pre-set position,
        one or more way-points (WP) set by a user, and
        a predicted position.

6. The tidal information display device of claim 1, wherein:
    the processing circuitry is further configured to superimpose a minimized version of the GUI on the image that includes a mini-gauge to indicate the present height of the tide and the moving direction of the tide.

7. The tidal information display device of claim 6, wherein:
    the processing circuitry is further configured to maximize or minimize at least one of:
        the GUI, and
        the mini-gauge,
    when a condition is met, the condition including at least one of:
        when a user performs a click operation,
        when the predetermined position exceeds a predetermined range from the detected position of the movable body, and
        when a number of GUIs on the image exceeds above a predetermined minimum threshold.

8. The tidal information display device of claim 6, wherein
    the predetermined position is at least one of:
        a port position,
        a pre-set position,
        one or more way-points (WP) set by a user, and
        a predicted position.

9. The tidal information display device of claim 1, wherein:
    the moving direction of the tide is indicated by a triangle-shaped indicator on a periphery of the gauge, and
    a direction of the triangle-shaped indicator indicates the moving direction of the tide vis-à-vis the height of the tide.

10. The tidal information display device of claim 9, wherein
    the triangle-shaped indicator is configured to move along the periphery of the gauge for indicating time left for at least one of: a high tide condition and a low tide condition to occur at the predetermined position based on the detected position of the moveable body.

11. The tidal information display device of claim 9, wherein
    the predetermined position is at least one of:
        a port position,
        a pre-set position,
        one or more way-points (WP) set by a user, and
        a predicted position.

12. The tidal information display device of claim 1, wherein
    the predetermined position is at least one of:
        a port position,
        a pre-set position,
        one or more way-points (WP) set by a user, and
        a predicted position.

13. The tidal information display device of claim 12, wherein
the geographic information is one of:
a geographical map, and
an image captured by an image sensor attached to the movable body.

14. The tidal information display device of claim 12, wherein:
the processing circuitry is further configured to receive the tidal information from one of:
an external communication equipment, and
one or more sensors attached to the movable body.

15. An augmented reality (AR) based navigation apparatus for a movable body, comprising:
an image sensor attached onto the movable body, the image sensor being configured to capture an image and output image data; and
processing circuitry configured:
to detect a position of the movable body;
to determine the image to be displayed on a display screen based on the detected position;
to receive and store tidal information based on the detected position;
to generate a graphical user interface (GUI) corresponding to a predetermined position of a tide on the display screen;
to superimpose the GUI on an image, captured by the image sensor, at the predetermined position on the display screen; and
to generate display data for displaying the GUI superimposed on the image at the predetermined position on the display screen, wherein
the GUI includes a gauge that displays a present height of the tide, a high tide time, a low tide time, and indicates a position of the tide, including a graphical represenation of an upwards or downwards moving direction of the tide.

16. The augmented reality (AR) based navigation apparatus of claim 15, wherein the GUI is a pop-up balloon.

17. A method for displaying tidal information for a movable body, on an image displayed on a display screen, comprising:
capturing an image by an image sensor attached to a movable body;
detecting a position of the movable body;
determining the image to be displayed on a display screen based on the detected position;
receiving and storing tidal information based on the detected position;
generating a graphical user interface (GUI) corresponding to a predetermined position of a tide on the display screen;
superimposing the GUI on the image at the predetermined position on the display screen; and
generating display data for displaying the GUI on the superimposed image at the predetermined position on the display screen, wherein
the GUI includes a gauge that displays a present height of the tide, a high tide time, a low tide time, and indicates a position of the tide, including a graphical representation of an upwards or downwards moving direction of the tide.

18. The tidal information display device of claim 17, wherein
the predetermined position is at least one of:
a port position,
a pre-set position,
one or more way-points (WP) set by a user, and
a predicted position.

* * * * *